United States Patent [19]

Dale

[11] Patent Number: 5,257,599
[45] Date of Patent: Nov. 2, 1993

[54] EXTERNAL-INTERNAL ROTARY COMBUSTION ENGINE

[76] Inventor: Thomas W. Dale, 157 Hughes Pl., Albertson, N.Y. 11507

[21] Appl. No.: 889,439

[22] Filed: May 28, 1992

[51] Int. Cl.⁵ .................. F02B 57/04; F02B 57/08
[52] U.S. Cl. .................. 123/44 B; 123/44 E; 123/234
[58] Field of Search .............. 60/39.6, 39.63; 123/44 B, 44 E, 204, 234

[56] References Cited

U.S. PATENT DOCUMENTS

| 4,336,686 | 6/1982 | Porter | 123/44 B X |
| 5,080,050 | 1/1992 | Dale | 123/44 B |

FOREIGN PATENT DOCUMENTS

| 1146698 | 4/1963 | Fed. Rep. of Germany | 123/44 B |
| 412745 | 2/1946 | Italy | 123/44 B |
| 266128 | 11/1988 | Japan | 123/44 B |

*Primary Examiner*—Michael Koczo
*Attorney, Agent, or Firm*—Galgano & Belkin

[57] ABSTRACT

An internal combustion engine in which various engine functions are carried out simultaneously rather than sequentially with the result that engine operation is smoother, less subject to vibrational forces, and has greater efficiency due to the elimination of the need to overlap functions. The engine comprises a rotatable cylinder made up of fuel charge, combustion, and working segments rotating in unison. The fuel charge and working segments each contain a plurality of radially arranged cylinders open at both ends and a spherical piston in and freely movable within each of the cylinders. A stationary cam surrounds the cylinder having cam surfaces to contact the spherical pistons within each of the cylinders causing each piston in its respective cylinder to reciprocate as the cylinder rotates. A stationary core is located within and enclosed by the rotatable cylinder for supplying and carrying away working fluid into and from the cylinders. Combustion chambers are formed within the combustion segment which separates the fuel charge and working segments. Within the stationary core is provision for delivering fuel charge to the combustion segment.

14 Claims, 7 Drawing Sheets

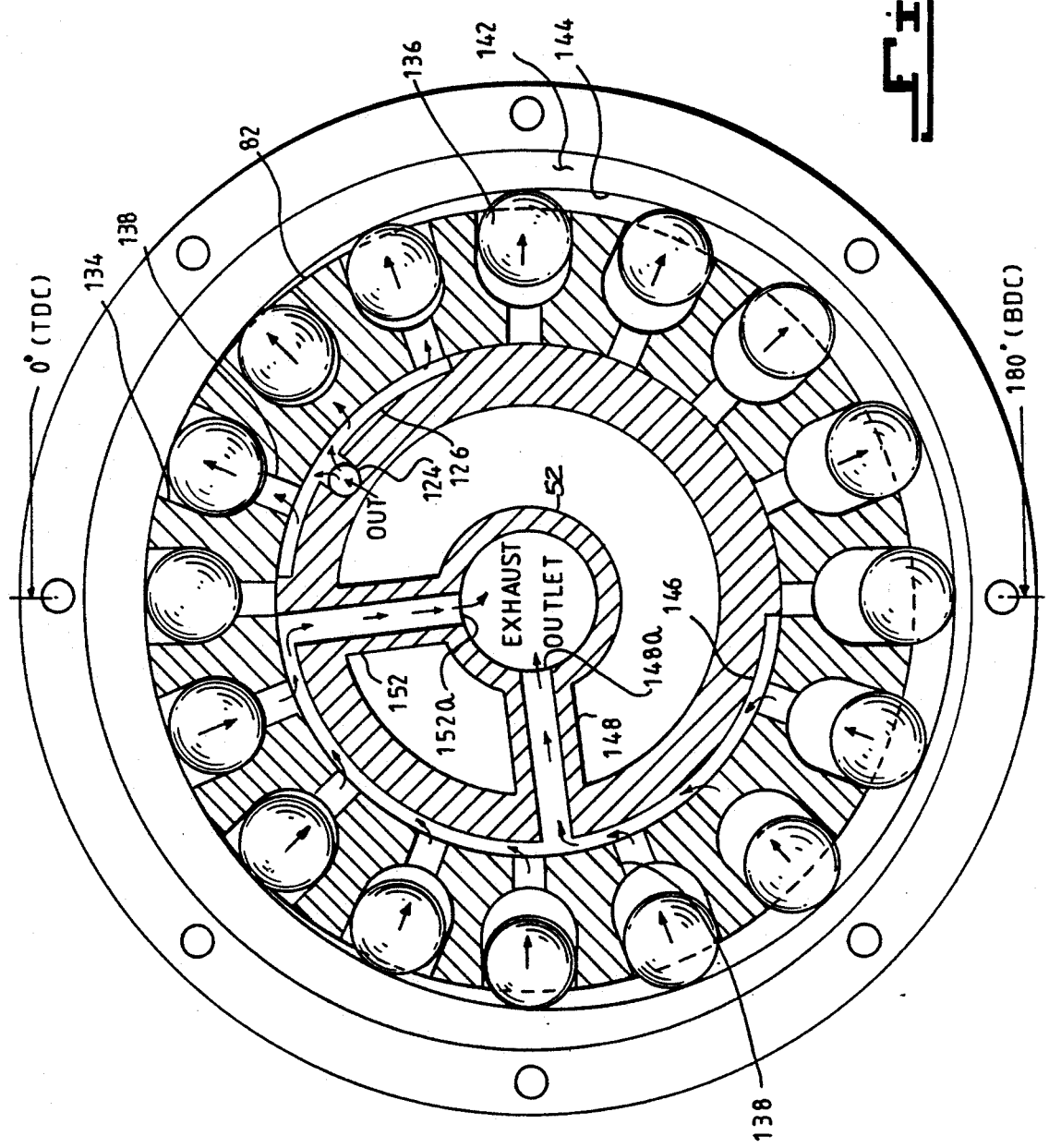

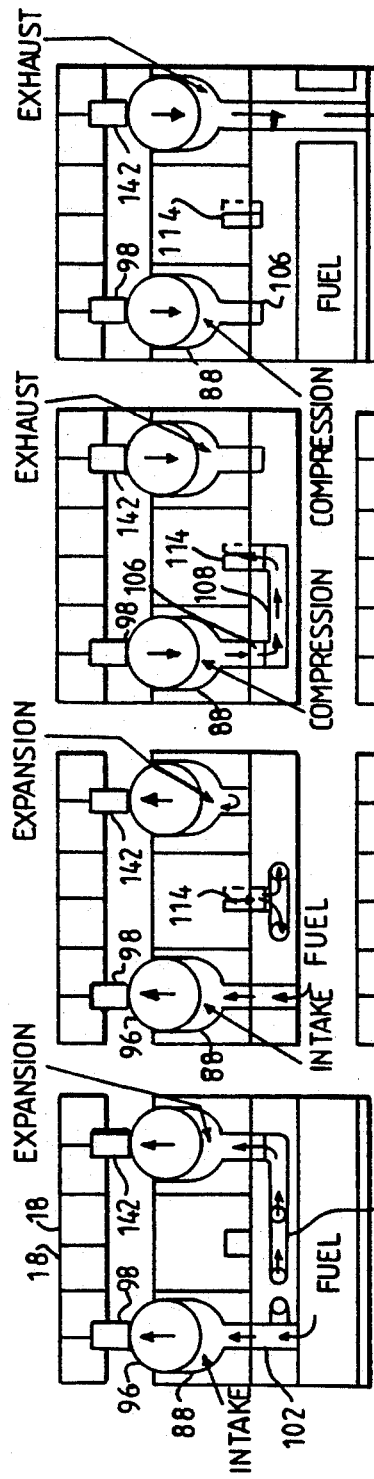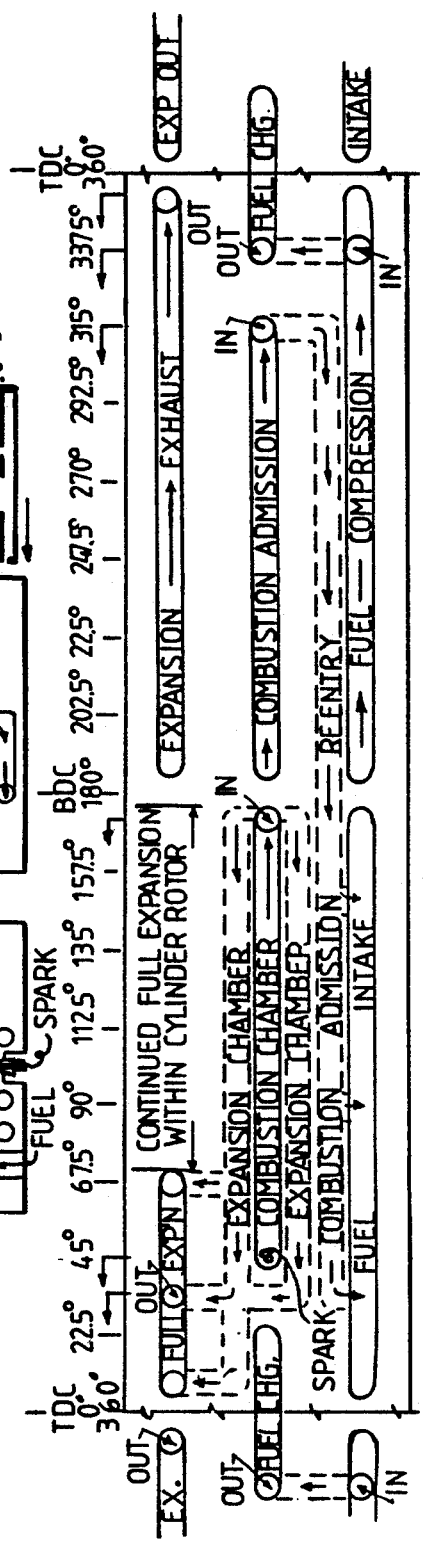

EXTERNAL-INTERNAL ROTARY COMBUSTION ENGINE

BACKGROUND OF THE INVENTION

The present invention relates to a rotary internal combustion engine and more particularly to a rotary internal combustion engine with more effective use of time in the engine cycle.

In the typical four cycle internal combustion engine a single piston and cylinder must accommodate four distinctly different events in successive order within the cylinder to deliver power. A fuel air mixture must be sucked into a chamber cool enough so that the fuel does not ignite from an earlier ignition. The mixture must then be compressed in the same chamber as much as possible without causing premature combustion from the heat of compression. Then the compressed fuel air mixture must be ignited in a manner that does not cause a rapid explosion, but rather a slow moving flame front which causes an expansion of the gases. Finally, it must rid this same chamber of the heat and waste products to prepare for the intake of a fresh fuel air mixture.

In order for all this to take place at precise timing, valves must open and close and ignition must take place at just the right time. This is possible only when an engine is running at a constant, reasonable speed and its timing can then be fixed to the time it takes for ignition, combustion and expansion to occur. However, an engine runs at many different speeds and the faster it runs the less time each event has to perform, and at increased speed the events start to overlap into other cycles (for example, having ignition before top dead center) until it becomes impossible to perform properly with maximum efficiency.

In addition, if the engine were running at a constant speed it is possible to supply just the right amount of fuel and cause ignition at just the right time for that speed to catch and consume all of the fuel before it is released into the atmosphere. However, in automotive engines the engine is constantly changing speed and it is impossible to have just the right amount of fuel and ignition and expansion to totally consume all the fuel before the next cycle takes place. This results in poor emission control and unburned hydrocarbons.

Still another problem with the conventional internal combustion engine concerns the necessity to reverse direction of movement of pistons, valves, etc. In the case of the piston, for example, at top dead center the piston starts to move down from its stop position, then is accelerated to its maximum velocity of movement, followed by its decelerating and reversal of direction of movement. The valves and the fuel charges are subject to the same kind of motion. As the engine increases in speed, these movements are crowded into shorter and shorter periods of time and the effects of inertia cause additional wear problems and tend to decrease the efficiency of the engine.

The rotary internal combustion engine deals with some of the aforementioned problems, but the limited amount of time to carry out the various functions is still a very crucial factor, especially as the speed of the engine increases.

SUMMARY OF THE INVENTION

In this invention, many of the problems associated with the internal combustion engine including those mentioned above as well as others to be noted below are avoided or diminished.

The invention described herein is an improvement on the engine described in my U.S. Pat. No. 5,080,050 issued on Jan. 14, 1992.

In accordance with the principles of this invention, an engine is provided in which the various engine functions described above are carried out continuously in separate parts of the engine rather than intermittently with the result that engine operation is smoother, less subject to vibrational forces, and with greater efficiency due to the elimination of the need to provide time in the engine cycle for the acceleration and deceleration of engine parts and fuel and exhaust gas flow. Furthermore, the overlapping of events in the cycle which contribute materially to inefficiency in engines presently in use are largely avoided.

A preferred embodiment of this invention comprises a rotatable cylinder made up of fuel charge, combustion, and working segments rotating in unison. The fuel charge and working segments each contain a plurality of radially arranged cylinders open at both ends and a spherical piston in and freely movable within each of the cylinders. A stationary cam surrounds the cylinders having cam surfaces to contact the spherical pistons within each of the cylinders causing each piston in its respective cylinder to reciprocate as the cylinder rotates.

A stationary core is located within and enclosed by the rotatable cylinder for supplying and carrying away working fluid into and from the cylinders. Combustion chambers are formed within the combustion segment which separates the fuel charge and working segments. Within the stationary core is provision for delivering fuel charge to the cylinders in the fuel charge segment. The spherical pistons in these cylinders compress the fuel charge for delivery to adjacent combustion chambers in the combustion segment.

The combustion chambers have provision to ignite the compressed fuel charge delivered from the fuel charge segment and transfer the burning fuel charge to adjacent cylinders in the working segment after a sufficient delay to permit combustion to continue until turbulence largely disappears which results in increased efficiency in the engine. A portion of the burning fuel charge from the combustion chambers is fed back after a delay sufficient to quench the combustion to mix with incoming fresh fuel air mixture to clear the combustion chambers in preparation for a fresh compressed fuel air charge. The combustion products expand to cause the spherical pistons within the working segment to rotate the shaft assembly connected to the rotatable cylinder delivering the output shaft power of the engine.

By separating within the engine the compression, burning, and expansion events of the cycle, the need to overlap any of these events is avoided with the result that greater efficiencies are attained.

It is thus a principal object of this invention to provide an internal combustion engine which makes more effective use of the time available during the cycle.

Other objects and advantages will hereinafter become obvious from the following description of preferred embodiments of this invention.

BRIEF DESCRIPTION OF THE DRAWINGS

FIG. 6 is a section view partially schematic taken along 6—6 of FIG. 1.

FIGS. 7a–7f show illustratively the various stages in the engine cycle.

FIG. 8 is a diagram illustrating schematically the order of events taking place in the engine.

DESCRIPTION OF THE PREFERRED EMBODIMENTS

Figure 1:
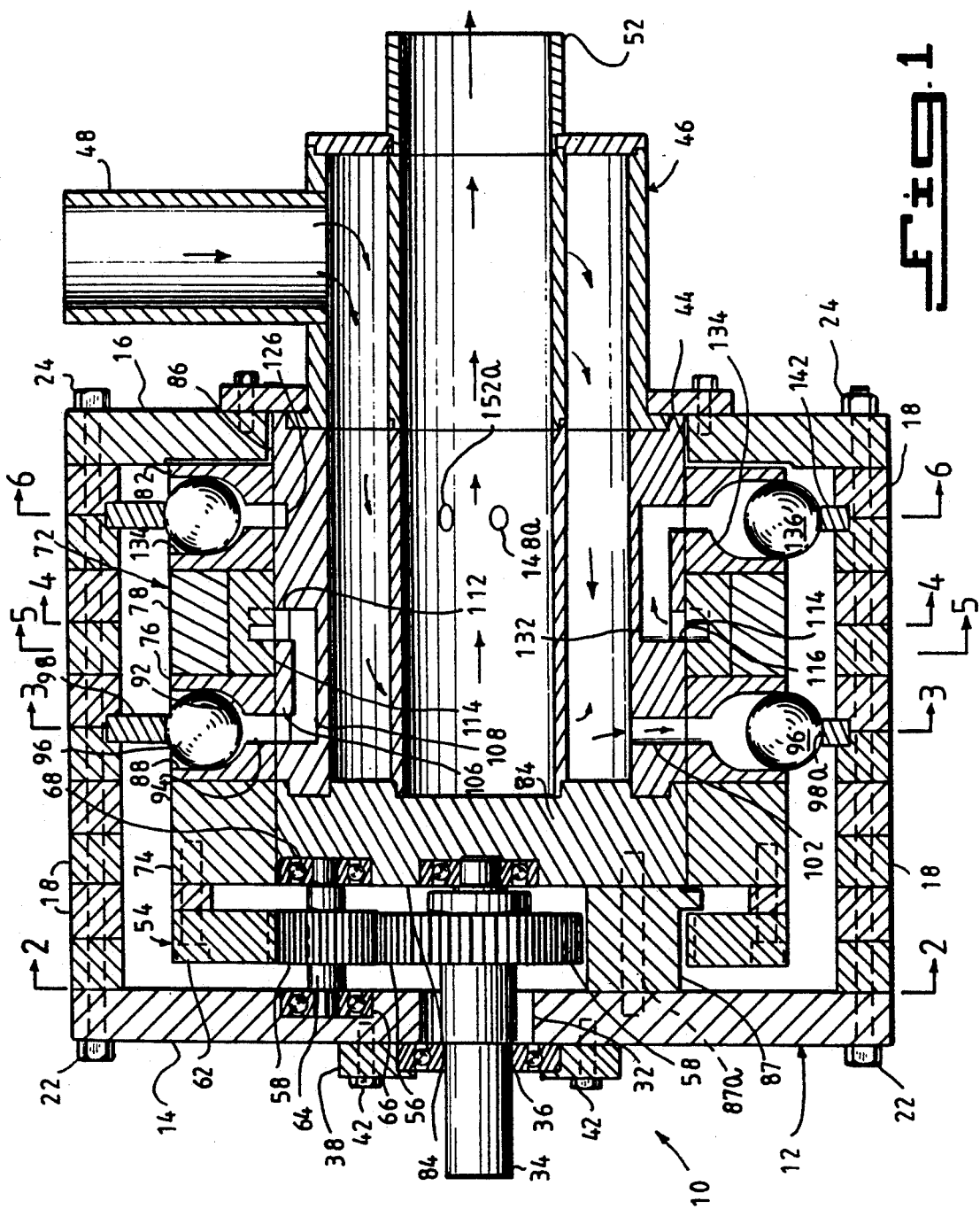
FIG. 1 is an elevation view in section of an internal combustion engine embodying the principles of this invention.

Referring to FIG. 1, internal combustion engine 10 comprises a housing 12 consisting of a pair of front and rear end plates 14 and 16, respectively, and a plurality of stacked housing rings 18 held together by elongated bolts 22 and nuts 24 forming the hollow interior illustrated.

Front end plate 14 is provided with a central opening 32 for passage therethrough of shaft 34 which is supported on the outside of housing 12 by bearings 36 secured by ring 38 mounted on the outside of end plate 14 by bolts 42.

Rear end plate 16 is provided with an opening 44 to accommodate manifold assembly 46 which provides for the supply of fuel-air mixture through conduit 48 and the exhaust of combustion products by way of conduit 52 in a manner which will be explained below.

Figure 2:
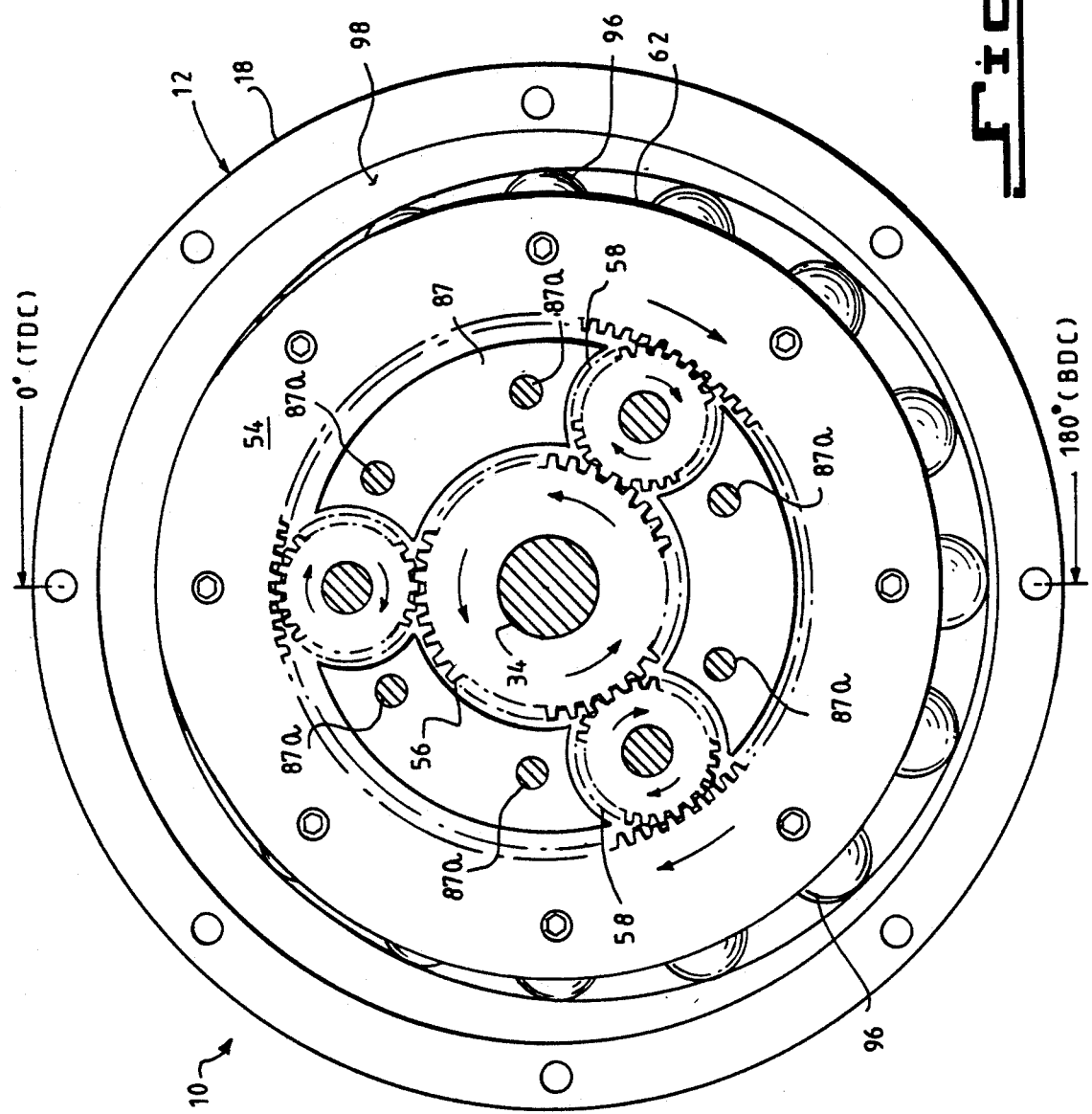
FIG. 2 is a section view partially schematic taken along 2—2 of FIG. 1.

As also seen in FIG. 2, mounted on shaft 34 within housing 12 is a gear system 54 consisting of sun gear 56 mounted on shaft 34, gears 58, and surrounded by ring gear 62. Gears 58 are supported on shafts 64 supported in bearings 66 and 68 mounted in front end wall 14 and manifold assembly 46 as will be more particularly described later. Attached to ring gear 62, and driven by, is a rotor assembly 72 which comprises ring-shaped segments 74, 76, 78, and 82 which are keyed together in a conventional manner (not illustrated) so as to rotate together.

Spacer segment 74 provides connection between the remaining segments and ring gear 62 in the manner illustrated. These segments will hereinafter be referred to as fuel charge segment 76, combustion segment 78, and working segment 82.

Manifold assembly 46 which is stationary during the operation of engine 10 comprises an end wall 84 in which are mounted bearings 68 previously described, an annular outer wall 86, and an inner, exhaust duct 52 previously described. As seen by the arrows, fresh fuel-air mixture flows into the annular space between duct 52 and annular wall 86 from duct 48 and the exhaust products of combustion flow out through duct 52 which will be more particularly described below.

A number of extension blocks 87 mounted between end walls 14 and 84 on shafts 87a provide rigid support for manifold assembly 46 within housing 12.

Figure 3:
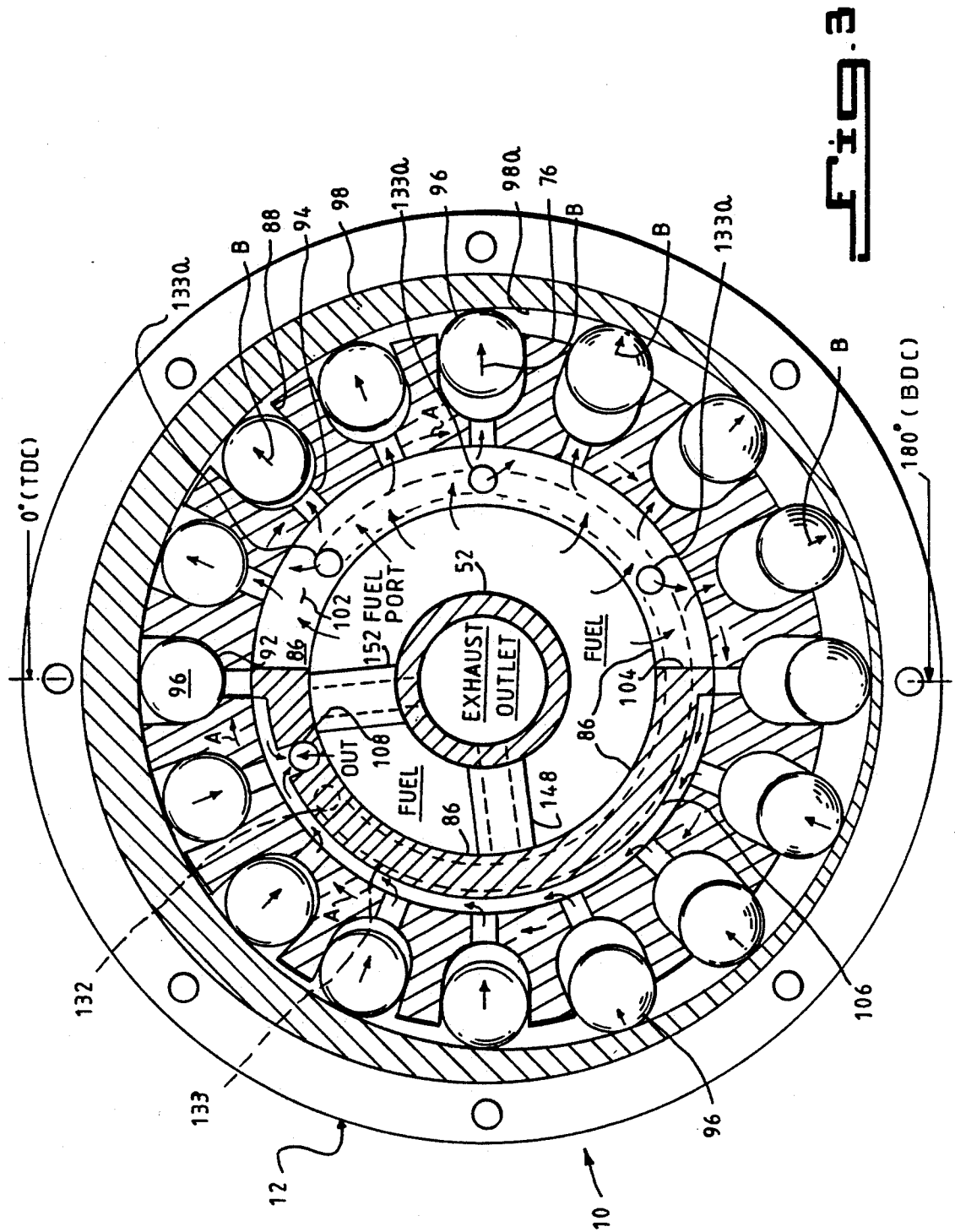
FIG. 3 is a section view partially schematic taken along 3—3 of FIG. 1.

As also seen in FIG. 3, fuel charge segment 76 contains a plurality of radially arranged cylinders 88 circular in cross section which are open at both the inside and outside of segment 76. The radially inward end of each cylinder 88 forms a spherical socket 92 with a passageway 94 penetrating the inner surface of segment 76.

Within each cylinder 88 is a spherical piston 96 free to slide up and down, and rotate within, cylinder 88.

Radial movement of piston 96 is controlled by a cam 98 mounted in ring segments 18 of housing 12. Cam surface 98a of cam 98 contacting pistons 96 is circular but is off-center from rotor assembly 72 with the consequence that as rotor assembly 72 turns as shown by arrows A in FIG. 3, pistons 96 will reciprocate within cylinders 88 from the most inward position shown at the top, to the most outward as shown in the bottom of FIGS. 1 and 3. As seen in FIG. 3, a single rotation of rotor assembly 72 results in each piston 96 moving radially in and out just once.

Figure 4:
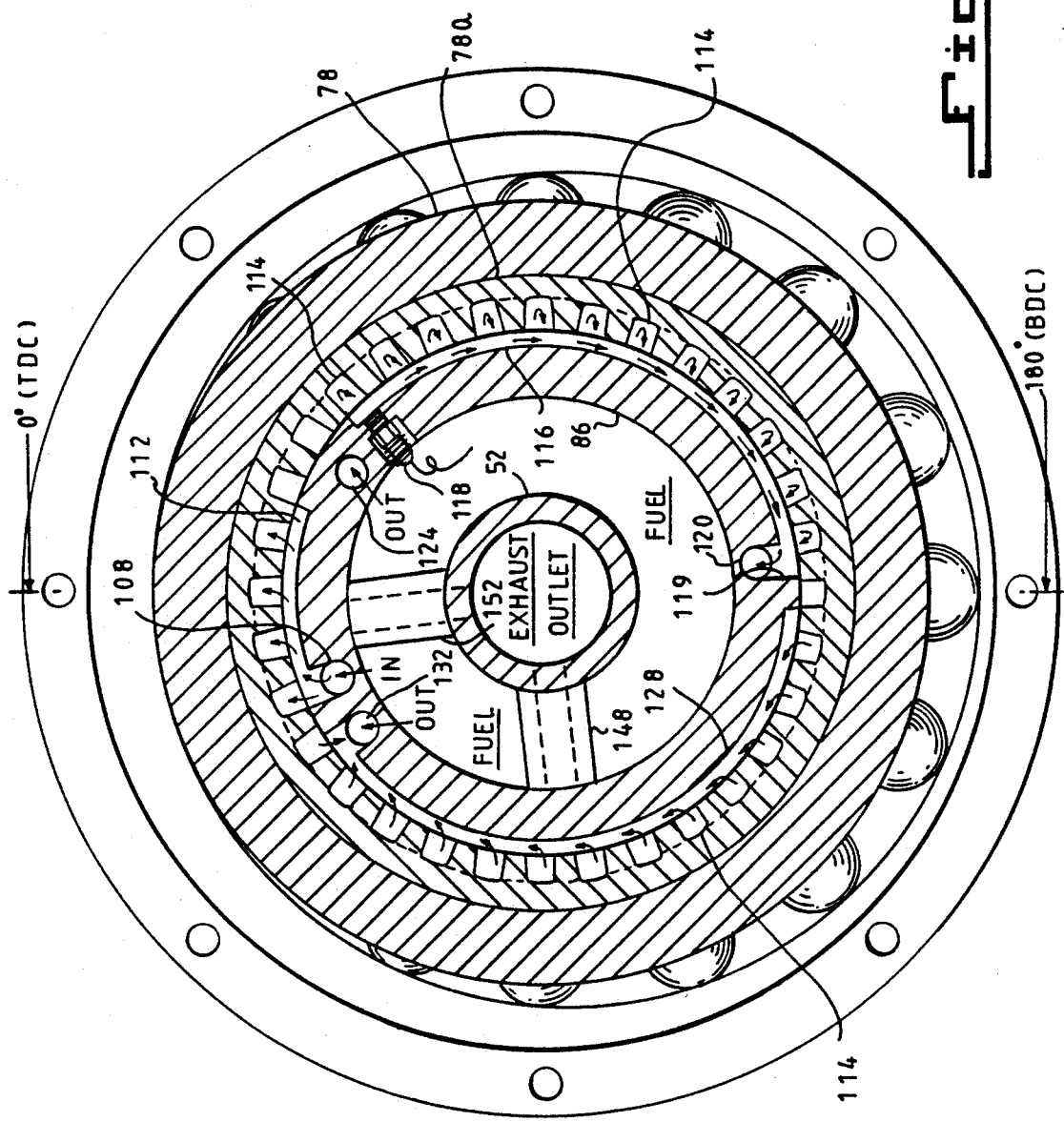
FIG. 4 is a section view partially schematic taken along 4—4 of FIG. 1.

Referring to FIG. 3, it will be seen that annular outer wall 86 of assembly 46 is provided with an annularly extending port 102 which extends from just past top dead center (TDC) to just before bottom dead center (BDC) so that as piston 96 moves outwardly as shown by arrows B for almost 180 deg. of rotation, fresh fuel-air mixture is being drawn into each cylinder 88. As each cylinder 88 moves past wall 104 ending port 102, BDC is reached and each cylinder opens into a groove 106 in outer wall 86 which extends from just past BDC to just before TDC. Groove 106 communicates with a passageway 108 which runs parallel to the axis or length of assembly 46 to communicate with a groove 112 directly under combustion segment 78 (as seen in FIG. 4). Groove 112 is seen to extend for a distance from just before to just after TDC.

From just after BDC to near TDC (see FIG. 3), pistons 96 are compressing the fuel-air mixture which is forced by way of groove 106 into passageway 108 and then by way of groove 112 to combustion segment 78 as will now be described.

Figure 5:
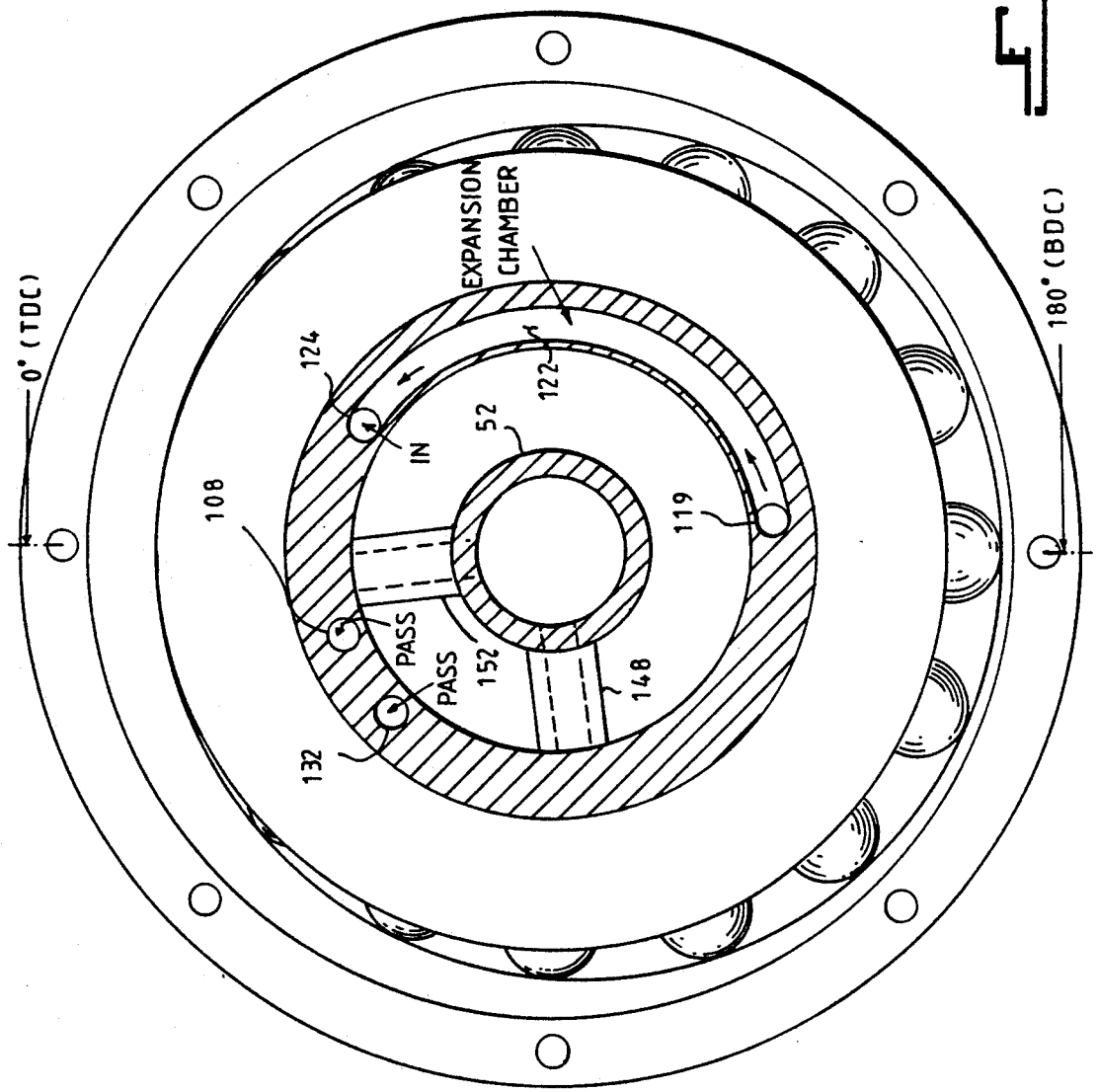
FIG. 5 is a section view partially schematic taken along 5—5 of FIG. 1.

As also seen in FIGS. 4 and 5, combustion segment 78 is provided with an insert 78a which contains a plurality of combustion chambers 114 which are shaped in the form of inwardly directed pockets. Chambers 114 are rectangular in cross section and become charged with compressed fuel-air mixture from groove 112 extending just past TDC. As segment 78 moves in a clockwise direction, chambers 114 containing compressed fresh fuel-air mixture will become exposed to an annularly extending groove 116 formed in wall 86.

A spark plug 118 located in groove 116 ignites the mixture. It is anticipated that once the engine is running it will not be necessary to use spark ignition as combustion from previously fired combustion chambers will supply the ignition for the freshly charged chambers. The flame front moves down the length of groove 116 and into a port 119 connected to a passageway 120 which extends axially through wall 86. Passageway 120 communicates with an annularly extending expansion chamber 122 as seen in FIG. 5 which returns (counter clockwise) the heated combustion products to an axially extending passageway 124 communicating with a groove 126 (see FIG. 6) supplying the compressed combustion products to power segment 82 which will be described below. The purpose of transferring the compressed combustion products in a counter clockwise direction back to a point earlier in the cycle is to provide more time for the combustion to continue and become less turbulent and thereby produce a more efficient expansion of the combustion products when producing the shaft output of the engine.

As seen in FIG. 4, the remaining combustion products within chambers 114 not discharged into passageway 120 as chambers 114 pass the end of groove 116 are discharged (to clear chambers 114 for a new charge) through a groove 128 and a passageway 132 which communicates with an annular passageway 133 (shown by hidden lines in FIG. 3) discharging the remaining combustion products through ports 133a into fresh fuel charge entering cylinders 88 in segment 76. The long path traversed by the combustion products from groove 106 to ports 133a is to insure that combustion is quenched so that no burning will take place in the fuel intake.

Referring to FIGS. 1 and 6, power segment 82 is similar in construction to segment 76 in that this segment is provided with a plurality of axially extending cylinders 134 containing spherical pistons 136 free to reciprocate and rotate therein as previously described. The compressed combustion products enter cylinders 134 from groove 126 by way of passageways 138. A cam 142 mounted in the outer housing segments 18 has a cam surface 144 which is circular but having a center which is offset from the center of rotor 72 so that pistons 136 riding on cam surface 144 under pressure by the compressed combustion products will cause the rotation or rotor 72 and provide the shaft output for engine 10. Pistons 136 will make a single forward and reverse stroke during one complete rotation of segment 82.

Past BDC, passageways 138 of cylinders 134 will discharge the spent combustion products into a groove 146 and out through tubes 148 and 152 into exhaust conduit 52 through ports 148a and 152a, respectively.

It is understood that conventional lubricating and cooling systems as required may be incorporated into the engine as described herein.

In the operation of engine 10, as illustrated also in FIGS. 7a-7f and 8, fresh fuel-air mixture is drawn into cylinders 88 of segment 76 between TDC and BDC after which the mixture is compressed and fed by way of groove 106 and passageway 108 to groove 112 and into combustion chambers 114. Hence, it is seen that cylinders 88 continuously draw in, compress, and discharge compressed fuel-air mixture.

In segment 78 the compressed fuel-air mixture in combustion chambers 114 continuously begins to fire and burn the mixture as each chamber 114 passes over groove 116. This permits the pressure to rise and the combustion products to spread through groove 116 and passageway 120 into chamber 122 counterclockwise to port 124 leading to groove 126 under power segment 82. The time delay introduced by chamber 122 permits a greater part of the combustion to be completed before the combustion products are inserted into working segment 82 thereby decreasing the amount of turbulence present with the consequent loss of efficiency. As previously noted, some of the combustion products not trapped in groove 116 are fed back into fuel charge segment 76 to mix with the incoming fresh fuel air charge.

Pistons 136 are driven to expand under the pressure of the combustion products to drive rotor 72 and produce the power output of engine 10.

By separating in different parts of the engine into compression, combustion and expansion steps, it is possible for all three to occur simultaneously without any one interfering or overlapping with any of the others. This produces greater efficiency and permits higher engine speeds to be reached without sacrificing any of this efficiency. In addition, since the fuel is always completely burned no matter how fast the engine is running, there are few emission problems to contend with.

It is thus been provided an internal combustion engine capable of increasing engine speed without the necessity to overlap various engine events and sacrifice efficiency.

While only certain preferred embodiments of this invention have been described it is understood that many variations are possible. For example, the order of segments 76, 78, and 82 may be reversed so that segment 82 is nearest to gear system 54, with segment 78 remaining in the middle. Other changes may also be made without departing from the principles of this invention as defined in the claims which follow.

What is claimed is:

1. A rotary engine comprising:
   a. rotating means comprising fuel charge, combustion, and working segments rotating in unison and displaced from each other along their axis of rotation;
   b. said fuel charge and working segments each containing a plurality of cylinders containing a piston freely reciprocal within each of the aforesaid cylinders;
   c. stationary cam means having cam surfaces to communicate with said piston within each of said cylinders and causing each said piston in its respective cylinder to reciprocate as said rotating means rotates;
   d. stationary core means within and enclosed by said rotating means for supplying and carrying away working fluid to and from said cylinders;
   e. combustion chambers formed in said combustion segment separating said fuel charge and working segments;
   f. means in said stationary core means for delivering fuel charge to said cylinders in said fuel charge segment, the pistons in said cylinders in said fuel charge segment compressing said fuel charge, said fuel charge segment including means to deliver the compressed fuel charge to adjacent combustion chambers in said combustion segment;
   g. means in said combustion chambers to ignite the compressed fuel charge delivered from said fuel charge segment and to transfer the burning fuel charge to adjacent cylinders in said working segment;
   h. said combustion products expanding in said working segment to cause said pistons within said working segment to work against said stationary cam means thereby causing said rotating means to rotate; and
   i. shaft means connected to said rotating means to deliver the output shaft power of said engine.

2. A rotary engine comprising:
   a. rotatable cylindrical means comprising fuel charge, combustion, and working segments rotating in unison and displaced from each other along their axis of rotation;
   b. said fuel charge and working segments each containing a plurality of radially arranged cylinders open at both ends, a spherical piston in and freely movable within each of the aforesaid cylinders;
   c. stationary cam means surrounding said cylindrical means having cam surfaces to contact the spherical pistons within each of said cylinders and causing each said piston in its respective cylinder to reciprocate as said cylindrical means rotates;

d. stationary core means within and enclosed by said rotatable cylindrical means for supplying and carrying away working fluid to and from said cylinders;

e. combustion chambers formed in said combustion segment separating said fuel charge and working segments;

f. means in said stationary core means for delivering fuel charge to said cylinders in said fuel charge segment, the spherical pistons in said cylinders in said fuel charge segment compressing said fuel charge, said fuel charge segment and stationary core means including means to deliver the compressed fuel charge to adjacent combustion chambers in said combustion segment;

g. means in said combustion chambers to ignite the compressed fuel charge delivered from said fuel charge segment to transfer the burning fuel charge to adjacent cylinders in said working segment, said stationary core means including means for delivering said burning fuel charge to said working segment;

h. said combustion products expanding in said working segment to cause said spherical pistons within said working segment to rotate said rotatable cylindrical means; and i. shaft means connected to said rotatable cylindrical means to deliver the output shaft power of said engine.

3. The method of operating an internal combustion engine in which said engine comprises cylindrical means having fuel charge, combustion, and working segments rotating in unison, said segments being displaced from each other along the axis of rotation of said segments, said fuel charge and working segments each containing a plurality of radially arranged cylinders open at both ends, a piston in and freely movable within each of the aforesaid cylinders, and stationary cam means surrounding said cylindrical means having cam surfaces to contact the pistons within each of said cylinders and causing each said piston in its respective cylinder to reciprocate as said cylindrical means rotates, the steps of said method comprising supplying a fresh fuel-air mixture to said fuel charge segment, transferring the compressed mixture through a stationary core means located within and enclosed by said rotatable cylindrical compressed mixture in combustion chambers formed in said means to said combustion segment, igniting said combustion segment to produce combustion products, transferring the combustion products through said stationary core means to said cylinders in said working segment, and expanding the combustion products in said working segment causing said pistons in said cylinders in said working segment to expand against the cam in contact therewith to cause rotation of said rotating cylindrical means to produce the shaft output of said engine.

4. A rotary engine comprising:

a. rotating means comprising fuel charge, combustion, and working segments rotating in unison;

b. said fuel charge and working segments each containing a plurality of cylinders containing a piston freely reciprocal within each of the aforesaid cylinders;

c. stationary cam means having cam surfaces to communicate with said piston within each of said cylinders and causing each said piston in its respective cylinder to reciprocate as said rotating means rotates;

d. stationary core means within and enclosed by said rotating means for supplying and carrying away working fluid to and from said cylinders;

e. combustion chambers formed in said combustion segment separating said fuel charge and working segments;

f. means in said stationary core means for delivering fuel charge to said cylinders in said fuel charge segment, the pistons in said cylinders in said fuel charge segment compressing said fuel charge, said fuel charge segment including means to deliver the compressed fuel charge to adjacent combustion chambers in said combustion segment;

g. means in said combustion chambers to ignite the compressed fuel charge delivered from said fuel charge segment and to transfer the burning fuel charge to adjacent cylinders in said working segment including means to introduce a time delay to permit turbulence to recede before said burning fuel charge enters the cylinders in said working segment;

h. said combustion products expanding in said working segment to cause said pistons within said working segment to work against said stationary cam means thereby causing said rotating means to rotate; and i. shaft means connected to said rotating means to deliver the output shaft power of said engine.

5. The rotary engine of claim 4 wherein said stationary core means includes an outer wall having grooves and passageways to provide communication between adjacent fuel charge, combustion, and working segments.

6. The rotary engine of claim 5 wherein said cylinders are radially extended and open at both ends whereby said cam surfaces make direct physical contact with said pistons.

7. The rotary engine of claim 6 wherein a portion of combustion products generated in said combustion chambers is transferred to said fuel charge segment for mixing with the incoming fresh fuel charge.

8. A rotary engine comprising:

a. rotatable cylindrical means comprising fuel charge, combustion, and working segments rotating in unison;

b. said fuel charge and working segments each containing a plurality of radially arranged cylinders open at both ends, a spherical piston in and freely movable within each of the aforesaid cylinders;

c. stationary cam means surrounding said cylindrical means having cam surfaces to contact the spherical pistons within each of said cylinders and causing each said piston in its respective cylinder to reciprocate as said cylindrical means rotates;

d. stationary core means within and enclosed by said rotatable cylindrical means for supplying and carrying away working fluid to and from said cylinders;

e. combustion chambers formed in said combustion segment separating said fuel charge and working segments;

f. means in said stationary core means for delivering fuel charge to said cylinders in said fuel charge segment, the spherical pistons in said cylinders in said fuel charge segment compressing said fuel charge, said fuel charge segment and stationary core means including means to deliver the compressed fuel charge to adjacent combustion chambers in said combustion segment;

g. means in said combustion chambers to ignite the compressed fuel charge delivered from said fuel charge segment to transfer the burning fuel charge to adjacent cylinders in said working segment, said stationary core means including means for delivering said burning fuel charge to said working segment, said means to transfer the burning fuel charge to adjacent cylinders in said working segment including means to introduce a time delay to permit turbulence to recede before said burning fuel charge enters the cylinder said working segment;

h. said combustion products expanding in said working segment to cause said spherical pistons within said working segment to rotate said rotatable cylindrical means; and i. shaft means connected to said rotatable cylindrical means to deliver the output shaft power of said engine.

9. The rotary engine of claim 8 wherein said stationary core means includes an outer wall having grooves and passageways to provide communication between adjacent fuel charge, combustion, and working segments.

10. The rotary engine of claim 9 wherein a portion of combustion products from said combustion chambers is transferred to said fuel charge segment for mixing with incoming fresh fuel charge.

11. The method of operating an internal combustion engine in which said engine comprises cylindrical means having fuel charge, combustion, and working segments rotating in unison, said fuel charge and working segments each containing a plurality of radially arranged cylinders open at both ends, a piston in and freely movable within each of the aforesaid cylinders, and stationary cam means surrounding said cylindrical means having cam surfaces to contact the pistons within each of said cylinders and causing each said piston in its respective cylinder to reciprocate as said cylindrical means rotates, the steps of said method comprising supplying a fresh fuel-air mixture to said fuel charge segment, compressing said fuel-air mixture in said fuel charge segment, transferring the compressed mixture through a stationary core means located within and enclosed by said rotatable cylindrical means to said combustion segment, igniting said compressed mixture in combustion chambers formed in said combustion segment to produce combustion products, transferring the combustion products through said stationary core means to said cylinders in said working segment while introducing a time delay to permit a greater part of the combustion to be complete before said combustion products are expanded in said working segment, and expanding the combustion products in said working segment causing said pistons in said cylinders in said cylinders in said working segment to expand against the cam in contact therewith to cause rotation of said rotating cylindrical means to produce the shaft output of said engine.

12. The method of claim 11 wherein said pistons are spherical and rotate as well as reciprocate in the cylinders.

13. The method of claim 12 wherein fresh fuel air mixture is delivered to said fuel charge segment and the products exhausting from said working segment are withdrawn from said engine through said stationary core means.

14. The method of claim 13 wherein a portion of the combustion products generated in said combustion chambers is transferred back to said fuel charge segment for mixing with incoming fresh fuel air mixture.

* * * * *